Feb. 2, 1926.

R. W. HOMPE

VALVE LOCK

Filed Sept. 6, 1924

INVENTOR.
Robert W. Hompe
BY
Fay, Oberlin & Fay
ATTORNEYS

Patented Feb. 2, 1926.

1,571,669

UNITED STATES PATENT OFFICE.

ROBERT W. HOMPE, OF CLEVELAND HEIGHTS, OHIO.

VALVE LOCK.

Application filed September 6, 1924. Serial No. 736,236.

*To all whom it may concern:*

Be it known that I, ROBERT W. HOMPE, a citizen of the United States, and a resident of Cleveland Heights, county of Cuyahoga and State of Ohio, have invented a new and useful Improvement in Valve Locks, of which the following is a specification, the principle of the invention being herein explained and the best mode in which I have contemplated applying that principle, so as to distinguish it from other inventions.

This invention, as has been indicated, relates to valve locks. More particularly, it comprises a housing carrying a valve lock and adapted to be applied to a standard valve without changing the construction of such valve beyond the mere cutting of a notch in the valve stem.

Heretofore valve locks have been provided, but in most instances such constructions required a special valve body, and are not adapted to be used with standard valves as they are installed. This involves considerable expense in installation, during which period the lines controlled by such valves must be interrupted and consequently much expense and annoyance is encountered. The present invention seeks to obviate the difficulties referred to, and by supplying a simple type of construction readily applicable to the standard form of valve every requirement of safety is met, and in addition no difficulty in connection with the installation of the same is entailed. To the accomplishment of the foregoing and related ends, said invention, then, consists of the means hereinafter fully described and particularly pointed out in the claim.

The annexed drawing and the following description set forth in detail certain mechanism embodying the invention, such disclosed means constituting, however, but one of various mechanical forms in which the principle of the invention may be used.

In said annexed drawing:—

Figure 1:
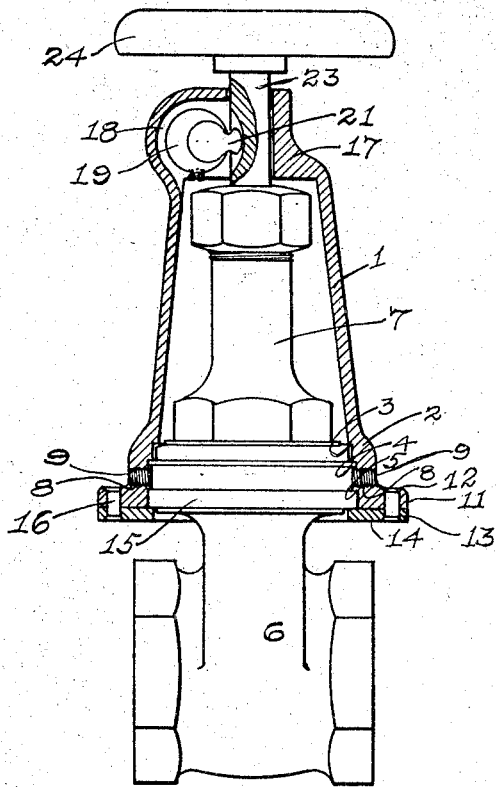
Figure 2:
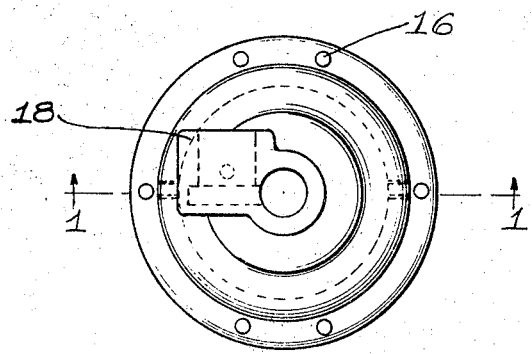

Fig. 1 is a side elevation of a gate type of valve with a valve lock applied thereto, the housing being shown in section, taken along the line 1—1 shown in Fig. 2 looking in the direction of the arrows; Fig. 2 is a top plan view of the device shown in Fig. 1 with the hand wheel of the valve removed.

As is clearly shown in the drawing, the invention comprises a housing formed of a main body section 1 of the shape of a truncated cone, the base 2 of which is provided with a series of countersunk sections adapted to rest upon the shoulders 3, 4 and 5 provided at the points of juncture of a gate valve 6 with the valve stem guide 7. At diametrically opposite points a pair of screw-threaded lateral openings 8 are provided, within which set screws 9 engage, said set screws being adapted to hold the housing firmly upon the valve body and prevent the rotation of the housing relative thereto.

At the extreme lower edge of the main body section an outwardly extending flange 11 is formed, said flange being provided at spaced intervals with openings 12 adapted to register with similar openings 13 in an annular closure plate 14, which is adapted to engage beneath the shoulders of the coupling member 15 of the valve. A plurality of fastening elements, shown as rivets 16, is used to connect the closure plate with the flange of the body member. The heads of the rivets are preferably countersunk and formed flush with the adjacent faces of the structure so that they may not be readily tampered with. The upper portion of the main body section is tapered to provide a cylindrical valve stem housing 17, and at one side thereof has formed integrally therewith a chamber 18, within which is received the casing 19 of a lock used to control the operation of the valve. The lock may be of any standard type suitable for the purpose, and is adapted to move a bolt 21 into a notch 22 cut into one side of the valve stem 23. This notch is preferably cut in the face of the valve stem adjacent the lock when the valve is in fully closed position.

The hand wheel 24 of the valve is adapted to fit upon the valve stem in a position closely adjacent to the main body portion of the valve lock. When the valve lock casing is in place a neat and attractive appearance is given to the valve-operating mechanism and the smooth sides of the casing prevents the accumulation of dirt and grease about the parts of the valve. The locking device is substantially constructed and presents no projecting portions which would invite tampering, or lead to difficulty in the manipulation of the lock.

While the construction has been illustrated as applied to a gate valve, it is obvious that it is equally applicable to valves of various types. As has been stated, the only modification of the valve structure is the cutting of a notch in one side of the valve stem, and the device therefore is readily applicable to any standard form of valve with a minimum of labor.

Other modes of applying the principle of my invention may be employed instead of the one explained, change being made as regards the mechanism herein disclosed, provided the means stated by the following claim or the equivalent of such stated means be employed.

I therefore particularly point out and distinctly claim as my invention:—

An attachment comprising a valve lock unit adapted to be applied about the stem and adjacent body structure of a standard valve beneath the handle thereof, having in combination a casing, a base plate forming the bottom closure of said casing and adapted to engage beneath the shoulder of the valve coupling, a set screw for preventing the rotation of said casing, a lock carried at the upper part of said casing, a bolt in said lock adapted to be projected toward said valve stem to engage a notch in said valve stem, and means for operating said lock.

Signed by me, this 2nd day of September, 1924.

ROBERT W. HOMPE.